Nov. 15, 1966    A. C. R. WILSON ET AL    3,286,150
MOTOR SPEED CONTROL MEANS
Filed Sept. 28, 1964    2 Sheets-Sheet 1
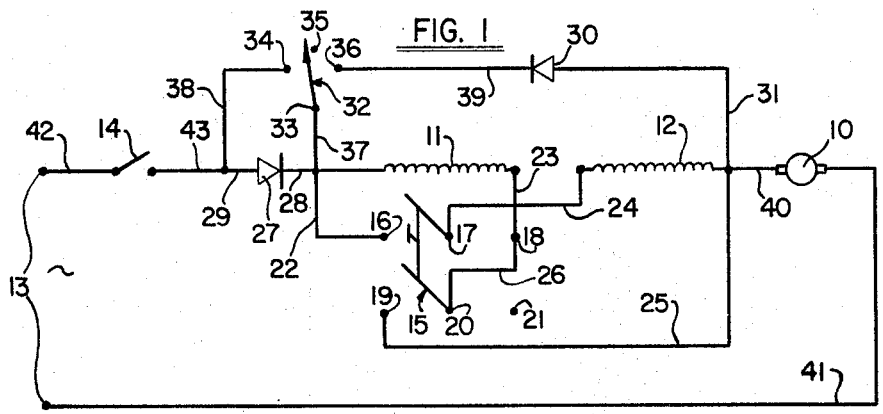
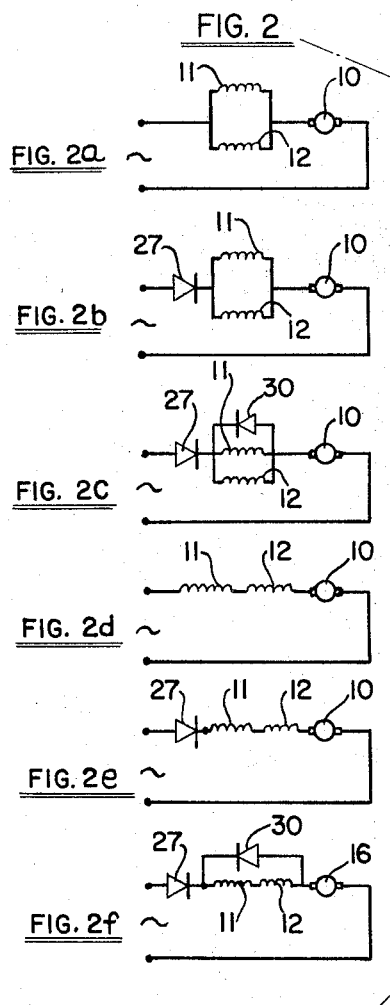
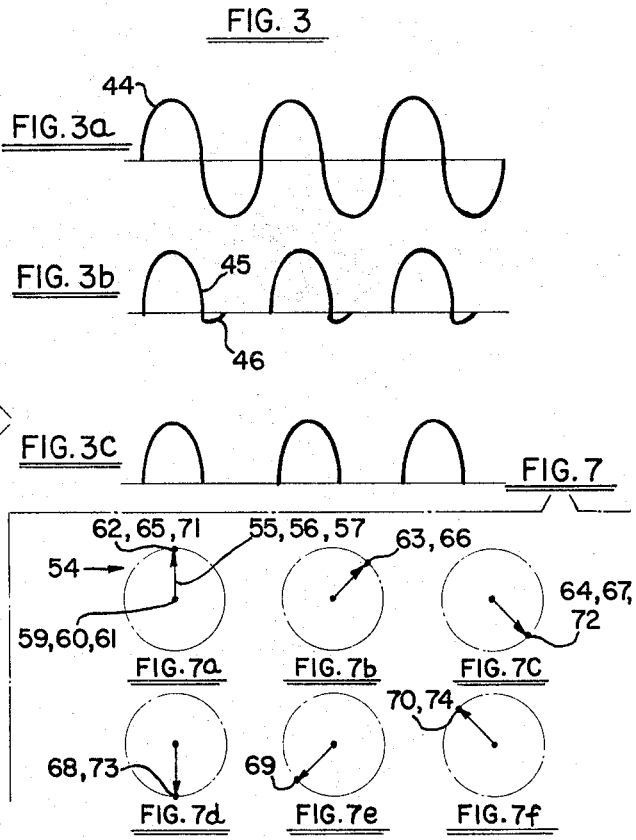
INVENTORS
ALEXANDER C. R. WILSON
JOHN G. LAWRENCE
BY Leonard Bloom
ATTORNEY Nov. 15, 1966  A. C. R. WILSON ETAL  3,286,150
MOTOR SPEED CONTROL MEANS
Filed Sept. 28, 1964  2 Sheets-Sheet 2
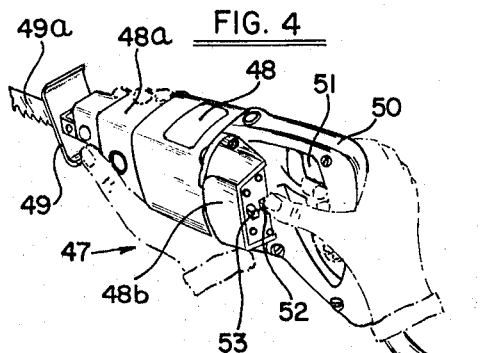
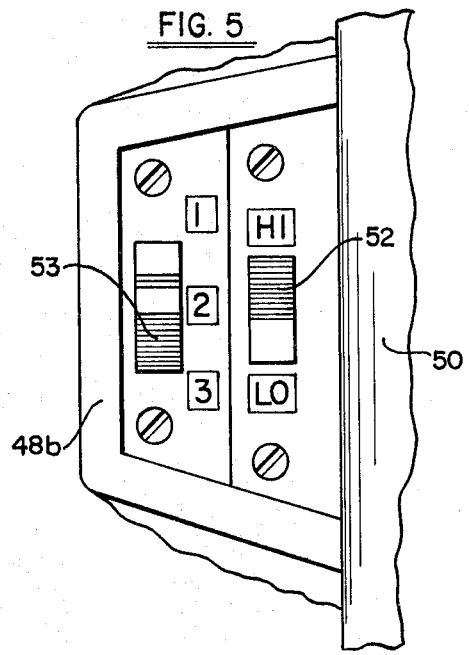
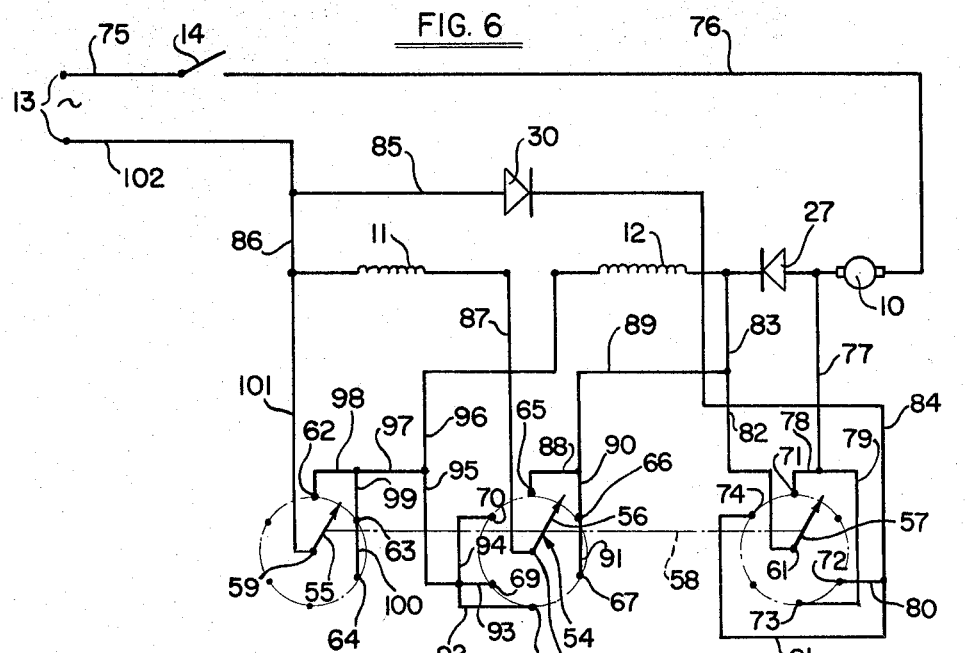
INVENTORS
ALEXANDER C.R. WILSON
JOHN G. LAWRENCE
BY *Leonard Bloom*
ATTORNEY United States Patent Office 3,286,150
Patented Nov. 15, 1966

1

3,286,150
MOTOR SPEED CONTROL MEANS
Alexander C. R. Wilson, Towson, and John G. Lawrence, Westminster, Md., assignors to The Black and Decker Manufacturing Company, Towson, Md., a corporation of Maryland
Filed Sept. 28, 1964, Ser. No. 399,645
7 Claims. (Cl. 318—245)

The present invention relates to a motor speed control means, and more particularly, to a multi-speed control means for a "universal" electric motor energized from a source of alternating current.

It is an object of the present invention to provide a convenient and inexpensive motor speed control means for a universal motor, especially one which is used in a portable electric tool.

It is another object to provide at least four, and preferably six, discrete speed settings for the motor.

The present invention may be used in conjunction with a universal electric motor comprising an armature and a field winding connected in series with each other across a source of alternating current, the winding including a pair of field coils; and more particularly, the invention relates to the improvement in speed control means for the motor. In a preferred embodiment, this improvement comprises, in combination, means to selectively connect the field coils in series or in parallel with each other; a first rectification means; means, selectively, to connect the first rectification means in series with the winding and the source of current; a second rectification means; and means, selectively, to connect the second rectification means in parallel with the winding and in opposition to the first rectification means whenever the first rectification means is connected in series with the winding and the source of current, whereby six discrete speed settings are provided for the motor.

Preferably, the first rectification means comprises a semiconductor diode, whereby the voltage wave of the source of alternating current is limited to its positive half cycle plus an "undershoot" of its negative half cycle created as a result of the relatively-high inductance of the field winding for the motor. The second rectification means, moreover, comprises a so-called "free wheeling" semiconductor diode, whose function is to recirculate the current in the field winding for the motor; and as a result, the undershoot on the negative half cycle is eliminated, and the effective voltage presented to the motor is limited to substantially .707 of its original value.

The means for selectively connecting the field coils in series or in parallel with each other constitutes a first switching means which preferably comprises a two-position sliding switch of the double-pole double-throw type. Moreover, the means to selectively connect the first rectification means in series with the winding and the source of current, and to selectively connect the second rectification means in parallel with the winding whenever the first rectification means is serially connected constitutes a second switching means which preferably comprises a three-position sliding switch disposed in close physical proximity to the aforesaid two-position sliding switch.

These and other objects of the present invention will become apparent from a reading of the following specification, taken in conjunction with the enclosed drawings, in which:

FIGURE 1 is a schematic electrical circuit used in a preferred embodiment of the motor speed control means of the present invention;

FIGURES 2a–2f are equivalent schematic circuits of the six discrete speed settings for the preferred motor control circuit, with FIGURE 2a being the highest speed setting, and with the speeds becoming progressively slower until the lowest speed setting, that of FIGURE 2f, is reached;

2

FIGURES 3a–3c show various voltage waveforms associated with different speed settings;

FIGURE 4 is a perspective of a typical portable electric tool with which the teachings of the invention may be applied, showing the conventional trigger switch in the end handle for the tool, and further showing the first and second sliding switches used to control the speed settings for the tool;

FIGURE 5 is a partial end view of the tool shown in FIGURE 4, enlarged over the scale of FIGURE 3, and showing the mounting of the sliding switches in close physical proximity to one another and to the trigger switch for convenient manual control;

FIGURE 6 is a modification of the schematic circuit of FIGURE 1, showing how the teachings of the invention may be applied for use with a six-position three-wafer ganged rotary switch; and FIGURES 7a–7e are a schematic illustration of the different positions of the ganged rotary switch.

With reference to FIGURE 1, there is illustrated a typical "universal" electric motor having an armature 10 and a field winding comprising a pair of field coils 11 and 12 connected across a source of alternating current 13 through a conventional on/off control switch 14.

A first switching means is provided to connect the field coils in series or in parallel with each other. This first switching means comprises a double-pole double-throw switch 15 having contacts or terminals denoted as at 16–21. A conductor 22 connects one end of field coil 11 to terminal 16. A conductor 23 connects the other end of field coil 11 to terminal 18. A conductor 24 connects one end of field coil 12 to the middle terminal 17. A conductor 25 connects the other end of field coil 12 to terminal 19. Finally, a conductor 26, comprising a jumper, connects terminals 18 and 20 of the switch.

A first rectification means is provided which comprises a semiconductor diode 27. A conductor 28 connects one end of diode 27 to one end of field coil 11. A conductor 29 connects the opposite end of the diode 27 to one end of the on/off switch 14.

A second rectification means is provided which comprises a semiconductor diode 30. A conductor 31 connects one side of the diode to the other end of field coil 12.

A second switching means is provided which comprises a three-position switch 32. The switch 32 has a common terminal 33 and spaced contacts or terminals 34, 35, and 36. A conductor 37 connects the common terminal 33 to the junction of the diode 27 and the field coil 11. A conductor 38 connects terminal 34 with the junction of diode 27 and the on/off switch 14. A conductor 39 connects terminal 36 to the diode 30.

Finally, a conductor 40 connects the other end of the field coil 12 to the armature 10; a conductor 41 connects the other end of the armature to the source of current 13; a conductor 42 connects the other side of the source to one side of the on/off switch 14; and a conductor 43 connects the other side of the on/off switch to the junction of the diode 27 and terminal 34 of the three-position switch 32.

The operation of the present invention will become apparent with reference to FIGURES 2a–2f. When the three-position switch 32 is thrown so as to connect terminal 34 with common terminal 33, diode 27 is shunted, while diode 30 is open circuited. In this position of switch 32, should the double-pole double-throw switch 15 be thrown such that its terminals 16 and 19 are connected, respectively, with its middle terminals 17 and 20, then the field coils 11 and 12 of the motor are connected in parallel with each other as shown in FIGURE 2a. The parallel connection of the field coils 11 and 12 is in series with the armature 10 and the source of alternating current 13, and both diodes 27 and 30 are out of the circuit. This is the highest speed setting for the motor, and the voltage waveform of the alternating current which is a typical "sine wave," is represented as at 44 in FIGURE 3a.

However, if the double-pole double-throw switch 15 is maintained in this position, but the three-position switch 32 is thrown so as to connect terminals 33 and 35, then the field coils 11 and 12 remain in parallel with each other, and the second diode 30 remains open-circuited. However, the first diode 27 is no longer shunted, but is now in series with the windings, the armature, and the source of current as shown in FIGURE 2b. This is the next lower speed setting for the motor.

The effect of the first diode 27, as shown in FIGURE 3b, is to limit the voltage wave form of the source of alternating current to its positive half cycles 45, thereby reducing the motor speed. The motor winding, however, generally comprises a relatively-high inductance, and as a result there is an "undershoot" of the negative half cycles of the voltage waveform, as denoted at 46 in FIGURE 3b.

The purpose of the second diode 30 is to eliminate the undershoot 46, thereby reducing the energization supplied to the motor, and thereby further reducing its speed.

If the three-position switch 32 is then thrown so as to connect its common terminal 33 with the terminal 36, then both diodes 27 and 30 are connected in the circuit as shown in FIGURE 2c. Here, the second diode 30 is in parallel with the winding, which comprises the field coils 11 and 12 connected in parallel with each other, while the first diode 27 remains in series with the winding, the armature, and the source of current. This is the next lower speed setting for the motor.

The second diode 30, which is connected "oppositely" to diode 27, comprises a so-called "free wheeling" diode, and its purpose is to recirculate the current in the winding, so as to eliminate the undershoot 46 on the negative half cycle; and hence the effective voltage presented to the motor is limited to substantially .707 of its original value.

If the three-position switch 32 is returned to its original position so that its common terminal 33 is connected to terminal 34, and if the double-pole double-throw switch 15 is now thrown so as to connect its middle terminals 17 and 20, respectively, with its terminals 18 and 21, then diode 27 is shunted and diode 30 is open circuited, as in FIGURE 2a, but the field coils 11 and 12 are now placed in series with each other as shown in the equivalent schematic schematic of FIGURE 2d. This is the next lower speed setting for the motor.

With the double-pole double-throw switch 15 remaining in that position, but with the three-position switch 32 thrown so as to connect terminals 33 and 35, then the first diode 27 is in series with the armature, the source of current, and the serially-connected field coils 11 and 12. This is the next lower speed setting for the motor, and the equivalent schematic as shown in FIGURE 2e.

Finally, if the three-position switch 32 is now thrown so as to connect terminals 33 and 36, then the second diode 30 is placed in parallel with the winding (comprising the serially-connected field coils 11 and 12) with the first diode 27 and armature 10 remaining in series with the winding and the source of current as shown in FIGURE 2f.

The function of diodes 27 and 30 in FIGURES 2e and 2f is the same as was related with regard to FIGURES 2b and 2c, respectively, and with regard to FIGURES 3b and 3c, respectively.

One specific physical embodiment of the invention is illustrated in FIGURES 4 and 5. Here, the invention has been applied to a portable electric sabre saw 47, which generally comprises a motor housing 48, a gear case 48a, a shoe 49, a reciprocating saw blade 49a, and an end handle 50 having an on/off trigger switch 51 by means of which the unit is energized and controlled. The trigger switch 51 comprises the on/off switch 14 of the schematic electrical circuit of FIGURE 1. Mounted rearwardly of the motor housing 48 and laterally of the end handle 50, is a housing 48b within which a pair of simple sliding switches 52 and 53 are suitably disposed. Sliding switch 52 comprises the double-pole double-throw switch 15 of FIGURE 1, while sliding switch 53 comprises the three-position switch 32. The mounting of switches 52 and 53 laterally adjacent to the trigger switch 51, and in close physical proximity to one another, allows for a close and convenient operator control over the speed of the tool as shown in FIGURE 4. Moreover, the speed settings may be changed while the tool is in operation, and there is no necessity for turning the tool off and inverting it or placing it on its side so as to get to a speed control member. As shown in FIGURE 5, switch 52 has "HI" and "LO" speed settings, the former for placing the field coils 11 and 12 in parallel, and the latter for placing the field coils in series. Switch 53, on the other hand, has speed settings of "1," "2," and "3," which relate, respectively, to connecting terminal 33 to terminals 34, 35, and 36. Setting "1" is the higher speed setting of the three, and so on. Consequently, when switch 52 is in its "HI" position and switch 53 is in its "1" position, this is the highest speed setting of the motor and corresponds to FIGURE 2a; and when switch 52 is in its "LO" position and switch 53 is in its "3" position, this is the lowest speed setting for the motor and corresponds to FIGURE 2f. All other intermediate settings correspond to FIGURES 2b through 2e, respectively.

A modification of the invention is illustrated schematically in FIGURE 6. Here, the separate sliding switches 52 and 53 (15 and 32, respectively) have been replaced by a six-position three-wafer ganged rotary switch 54 for a unitary control over the speed-changing means. This rotary switch 54 has movable contact members illustrated schematically as 55, 56, and 57, and "ganged" together as at 58 for a conjoint rotary movement. The common terminals of these movable contact members are shown as at 59, 60, and 61, respectively. Contact member 55 has associated with it three "dormant" terminals, undesignated, and three operational terminals designated as 62, 63, and 64. Contact member 56 has six operational terminals designated as 65, 66, 67, 68, 69, and 70. Contact member 57 has two "dormant" terminals, undesignated, and four operational terminals designated as 71, 72, 73, and 74. In FIGURE 6, moreover, the armature is still denoted by 10, the field coils by 11 and 12, the source of alternating current by 13, the on/off control switch by 14, the first diode by 27, and the second diode by 30.

The interconnection of the components of FIGURE 6 is as follows: A conductor 75 connects one side of the source 13 with the on/off switch 14. A conductor 76 connects the other side of switch 14 with the armature 10. Conductors 77 and 78 connect the other side of the armature with terminal 71 of movable contact member 57 of the rotary switch 54. A conductor 79, comprising a jumper, connects terminal 71 to terminal 73. Conductors 80 and 81 connect terminal 72 to terminal 74. Conductors 82 and 83 connect the common terminal 61 to the junction of diode 27 and field coil 12. A conductor 84 connects terminal 72 (through conductor 80) to one side of diode 30. Conductors 85 and 86 connect the other side of diode 30 with one side of field coil 11. A conductor 87 connects the other side of field coil 11 with the common terminal 60 of the movable contact member 56 of switch 54. Conductors 88 and 89 connect terminal 65 of movable contact member 56 (through conductor 83) with the junction of field coil 12 and diode 27. Conductors 90 and 91, along with conductor 88, connect terminals 65, 66, and 67 to each other. Conductors 92, 93, and 94 connect terminals 68, 69, and 70 to each other. Conductors 95 and 96 in turn connect terminal 69 (and hence terminal 68 and 70) to the other side of field coil 12. Conductor 97, 98, 99, and 100 connect this other side of field coil 12 with the terminals 62, 63, and 64 of movable contact member 55, all with each other. Finally, a conductor 101 connects the common terminal of movable contact member 55 with the junction of field coil 11 and diode 30, while a conductor 102 connects this junction with the other side of the source of current 13.

The operation of this embodiment of the invention is identical to that which was previously explained with regard to FIGURE 1. When the switch 54 is turned so that movable contact member 55 connects terminals 59 and 62, and movable contact member 56 connects terminals 60 and 65, and movable contact member 57 connects terminals 61 and 71, as represented schematically in FIGURE 7a, then the field coils 11 and 12 are in parallel with each other, yet in series with the armature and the line or other source of current as shown in the equivalent schematic of FIGURE 2a. In FIGURE 7b, movable contact member 55 connects terminals 59 and 63, movable contact member 56 connects terminals 60 and 66, and movable contact member 57 connects its common terminal with a "dormant" contact or terminal; and as a result, the field coils 11 and 12 remain in parallel with each other, but the diode 27 is connected in series with the coils, the armature, and the source as shown in the equivalent schematic of FIGURE 2b. The remaining positions of the ganged rotary switch 54 illustrated schematically in FIGURES 7c, 7d, 7e, and 7f correspond, respectively, to the equivalent schematic circuits of FIGURES 2c, 2d, 2e, and 2f.

Obviously, many modifications may be made without departing from the basic spirit of the present invention; and accordingly, within the scope of the appended claims, the invention may be practiced other than has been specifically described herein.

We claim:
1. In a "universal" electric motor comprising an armature and a field winding connected in series with each other across a source of alternating current, the winding including a pair of field coils; the improvement in speed control means, which comprises:
 (a) means, selectively, to connect the field coils in series or in parallel with each other;
 (b) a first rectification means;
 (c) means, selectively, to connect said first rectification means in series with the winding and the source of current;
 (d) a second rectification means; and
 (e) means, selectively, to connect said second rectification means in parallel with the winding and in opposition to said first rectification means whenever said first rectification means is connected in series with the winding and the source of current;
 (f) whereby six discrete speed settings are provided for the motor.

2. The improvement of claim 1, wherein the motor winding comprises a relatively-high inductance, and wherein:
 (a) said first rectification means comprises a diode, whereby the voltage wave of the source of alternating current is limited to its positive half cycle plus an "undershoot" of its negative half cycle due to the relatively-high inductance of the winding; and wherein:
 (b) said second rectification means comprises a "freewheeling" diode for recirculating the current in the winding;
 (c) whereby the "undershoot" on the negative half cycle is eliminated, and whereby the effective voltage is limited to substantially .707 of its original value.

3. In a "universal" electric motor comprising an armature and a field winding connected in series with each other and with a source of alternating current, the winding including a pair of field coils; the improvement in speed control means which comprises:
 (a) first switching means for selectively connecting the field coils in series or in parallel with each other;
 (b) first rectification means;
 (c) second switching means for selectively connecting said first rectification means in series with the winding and the source of current;
 (d) second rectification means; and
 (e) said second switching means including means for selectively connecting said second rectification means in parallel with the winding and in opposition to said first rectification means whenever said first rectification means is connected in series with the winding and the source of current;
 (f) whereby six discrete speed settings are provided for the motor.

4. The improvement of claim 3, wherein:
 (a) said first first switching means comprises a two-position sliding switch of the double-pole double-throw type; and wherein:
 (b) said second switching means comprises a three-position sliding switch disposed in close physical proximity to said two-position sliding switch.

5. The improvement of claim 3, wherein said first switching means and said second switching means comprises:
 (a) a ganged rotary switch.

6. In a "universal" electric motor comprising an armature and a field winding connected in series with each other and with a source of alternating current, the winding including a pair of field coils; the improvement in speed control means, which comprises:
 (a) first switching means having two alternate positions for connecting the field coils, selectively, in series or in parallel with each other;
 (b) a rectification means; and
 (c) second switching means having at least two alternate positions for, first, connecting said rectification means, selectively, in series with the winding and the source of current in each position of said first switching means, and secondly, for shunting said rectification means;
 (d) whereby four discrete speed settings are provided for the motor.

7. In a portable electric tool having a housing and a "universal" electric motor in the housing, the motor comprising an armature and a field winding connected in series with each other and with a source of alternating current, the winding including a pair of field coils; the improvement in speed control means, which comprises:
 (a) first switching means mounted on the tool housing and having two alternate positions for connecting the field coils, selectively, in series or in parallel with each other;
 (b) a rectification means;
 (c) second switching means mounted on the tool housing and having at least two alternate positions for, first, connecting said rectification means, selectively, in series with the winding and the source of current in each position of said first switching means, and secondly, for shunting said rectification means;
 (d) whereby four discrete speed settings are provided for the motor; and
 (e) a control switch mounted on the tool housing for connecting the tool with a source of alternating current.

References Cited by the Examiner
UNITED STATES PATENTS

| | | | |
|---|---|---|---|
| 2,226,700 | 12/1940 | Appleman | 318—305 |
| 2,851,647 | 9/1958 | Alexanderson | 318—305 |
| 3,035,217 | 5/1962 | Bertrand | 318—246 |

ORIS L. RADER, *Primary Examiner.*

G. Z. RUBINSON, *Assistant Examiner.*